April 15, 1947.　　　T. V. SMITH　　　2,418,855
TIRE INFLATION STAND
Filed Aug. 30, 1945
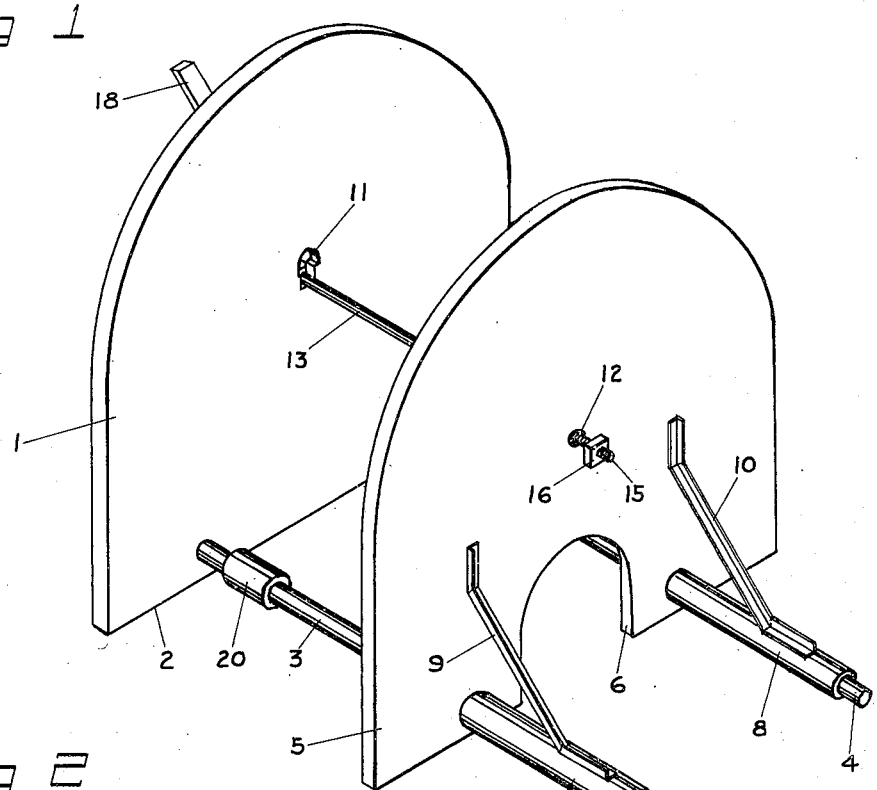
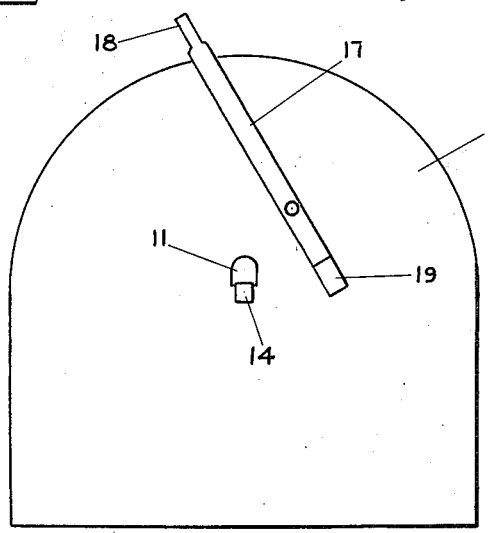
INVENTOR
THURMAN V. SMITH
BY
Ralph L Chappell
ATTORNEY Patented Apr. 15, 1947

2,418,855

UNITED STATES PATENT OFFICE 2,418,855

TIRE INFLATION STAND

Thurman V. Smith, Centerville, Utah

Application August 30, 1945, Serial No. 613,689

2 Claims. (Cl. 109—49.5)

(Granted under the act of March 3, 1883, as amended April 30, 1928; 370 O. G. 757)

This invention relates to a tire inflation stand and more particularly to a stand adapted to support and secure a tire assembly during the inflation process.

When a tire in an assembly of the type including a lock rim is inflated, there is a tendency for the lock rim to be thrown off with considerable force. A lock rim so thrown is a hazard such as may cause injury to anything in its path.

It is the principal object of the present invention to provide a stand in which a tire assembly may be supported and secured during the inflation process in such manner that a lock rim thereon is retained against being thrown off.

It is a further object of the invention to provide for carrying out the foregoing object in an economical, facile and efficient manner.

In accomplishing these and other objects of the present invention, I have provided improved details of structure, the preferred form of which is illustrated in the accompanying drawings, wherein:

Fig. 1 is a perspective view of a tire inflation stand embodying the features of my invention.

Fig. 2 is a rear elevational view of the tire inflation stand shown in Fig. 1.

Referring more in detail to the drawing:

The stand of my invention comprises a rear upright 1, preferably formed of steel plate or other suitable material. Preferably the lower edge of the upright 1 is substantially straight, as indicated at 2, to adapt the upright to rest on a supporting surface in a vertically disposed position. Preferably the height and width of the upright 1 approximate the diameter of a large truck tire of the type normally secured to a wheel by means of a lock rim.

Secured to the front face of the rear upright 1, as by welding or threaded engagement, are a pair of spindles 3 and 4. Preferably the spindles 3 and 4 are substantially circular in cross section and their longitudinal axes are disposed perpendicularly to the plane of the upright 1.

The stand also comprises a front upright 5, also preferably formed of steel plate or other suitable material, and supported in spaced parallel relation to the rear upright 1. Preferably the exterior configuration and dimensions of the front upright 5 are substantially similar to those of the rear upright 1. The lower edge of the front upright 5 preferably has a cut-out 6 therein to furnish access to the valve of a tire assembly supported in the stand.

The front upright 5 has a pair of apertures therethrough positioned to receive the spindles 3 and 4 on the rear upright 1. Preferably a pair of hollow sleeves 7 and 8 are secured to the front face of the front upright 5, as by welding or threaded engagement, in registry with the apertures therethrough. Preferably the sleeves 7 and 8 are cylindrical and their longitudinal axes are disposed perpendicularly to the plane of the upright 5. Preferably the bores through the sleeves 7 and 8 are of a diameter such that the spindles 3 and 4 are snugly received therein but are freely slidable therethrough. A pair of braces 9 and 10 may be provided between the sleeves 7 and 8 and the upright 5, the braces being preferably in the form of angle irons welded to the respective members.

The rear upright 1 may have a key-hole slot 11 therethrough, preferably located in the central portion thereof, and the front upright 5 may have an aperture 12 therethrough, which is substantially aligned with the key-hole slot 11. A tie rod 13, having a head 14 adjacent one end and a threaded portion 15 adjacent the other end, may be fitted through the apertures 11 and 12. Preferably the head 14 is inserted through the key-hole slot 11 and the threaded portion 15 protrudes forwardly of the front upright 5. A nut 16 may be threadedly engaged with the threaded portion 15 of the tie rod 13.

A lever 17 may be pivoted to the rear face of the rear upright 1 to provide a means for retaining the tie rod 13 against rotary movement or relative movement rearwardly of the rear upright. The lever 17 preferably has a handle portion 18 that protrudes beyond the edge of the rear upright 1 to furnish a convenient means for operating the lever. At the opposite end of the lever 17 is a latch portion 19 adapted to be engaged over the head 14 of the tie rod 13 to prevent rotary or relative rearward movement of the tie rod.

A stop 20 may be secured to the spindle 3 or 4 to limit relative movement of the upright 5.

*Operation*

The stand is assembled but with the tie rod 13 removed. A tire to be inflated and ordinarily being in an assembly of the type including a lock rim is placed between the uprights 1 and 5 with the valve being situated where it is accessible through the opening 6 in the front upright 5. The front upright 5 is pushed rearwardly along the spindles 3 and 4 to clamp the tire assembly between the uprights.

If the tie rod 13 is included in the structure, it is placed through the central portion of the tire assembly and the head 14 is engaged with the key-hole slot 11. The nut 16 is applied to the threads 15 and tightened thereon to confine the tire tightly between the uprights.

The latch 19 on the lever 17 may be engaged over the head 14 on the tie rod 13 to hold the tie rod in position.

The tire is inflated by appropriate means. Normally the inflation process has a tendency to throw the lock rim off the assembly. However the uprights 1 and 5 retain the lock rim securely in the tire assembly.

The inflated tire may be removed from the stand by loosening and removing the nut 16 and removing the tie rod 13 and then sliding the front upright 5 forwardly.

While I have shown but one embodiment of my invention, it is apparent that the device is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. A tire inflation stand comprising a rear upright, a pair of spindles secured to said rear upright and being perpendicularly disposed thereto, a front upright positioned in spaced parallel relation to said rear upright and having a pair of apertures therethrough receiving said spindles, a pair of sleeves secured to said front upright in registry with said apertures and receiving said spindles, the space between said uprights being adapted to receive a tire assembly, said front upright having a cut-out therein adapted to furnish access to the valve of a tire assembly received between said uprights, a tie rod connecting said uprights adapted to clamp said uprights against a tire assembly therebetween and means holding said tie rod against rotation.

2. A tire inflation stand comprising a rear upright, a pair of spindles secured to said rear upright, a front upright having a pair of apertures therethrough receiving said spindles, a pair of sleeves secured to said front upright in registry with said apertures and receiving said spindles, the space between said uprights being adapted to receive a tire assembly, said front upright having a cut-out therein adapted to furnish access to the valve of a tire assembly supported between said uprights, and a tie rod connecting said uprights adapted to clamp said uprights against a tire assembly supported therebetween.

THURMAN V. SMITH.

REFERENCES CITED

The following references are of record in the file of this patent:

UNITED STATES PATENTS

| Number | Name | Date |
| --- | --- | --- |
| 1,202,444 | Soleau | Oct. 24, 1916 |
| 2,323,846 | Saltsman | July 6, 1943 |
| 431,373 | Mendenhall | July 1, 1890 |
| 945,877 | Updegraff | Jan. 11, 1910 |
| 1,443,896 | Kaufman | Jan. 30, 1923 |
| 2,315,799 | La Guardia et al. | Apr. 6, 1943 |